United States Patent [19]

Fayngersh et al.

[11] Patent Number: 4,646,693
[45] Date of Patent: Mar. 3, 1987

[54] ROTARY ENGINE

[76] Inventors: Zachary Fayngersh, 66 Huntington Dr., West Hartford, Conn. 06117; Valery Minnes, 21 Robin Rd., Apt. A-1, West Hartford, Conn. 06119; Valentine Prokopets, 33 Still Rd., West Hartford, Conn. 06117

[21] Appl. No.: 701,109

[22] Filed: Feb. 13, 1985

Related U.S. Application Data

[63] Continuation-in-part of Ser. No. 485,720, Apr. 18, 1983, abandoned.

[51] Int. Cl.$^4$ .................................... F02B 53/00
[52] U.S. Cl. ................................ 123/238; 123/214; 60/39.62
[58] Field of Search ........... 60/39.38, 39.4, 39.76, 60/39.78, 39.8, 39.62, 39.6, 729; 123/238, 249, 204, 214

[56] References Cited

U.S. PATENT DOCUMENTS

| | | | |
|---|---|---|---|
| 611,125 | 9/1898 | Humphrey | 60/39.6 |
| 939,751 | 11/1909 | Schulz | 123/231 |
| 1,152,862 | 9/1915 | Taylor | 123/249 |
| 1,184,650 | 5/1916 | Ingraham | 123/238 |
| 1,856,011 | 4/1932 | Woodward | 123/204 |
| 2,829,493 | 4/1958 | Hobson | 60/39.38 |
| 3,213,612 | 10/1965 | Omer | 60/39.8 X |
| 4,149,370 | 4/1979 | Vargas | 60/39.6 |

FOREIGN PATENT DOCUMENTS 641415  4/1928  France .................. 60/39.78

Primary Examiner—Michael Koczo
Attorney, Agent, or Firm—McCormick, Paulding & Huber

[57] ABSTRACT

A twin rotor engine has a combustion chamber in which the fuel and air mixture is periodically exploded, and an inlet valve selectively delivers the expanding gasses to an expansion chamber defined by a housing and by the rotors. An outlet valve serves to vent the combustion chamber and both valves are driven from a cam shaft which may be geared to one of the rotors, or which may be rotated independently of the rotors so that rotor speed need not have a fixed relationship to valve timing. An alternative embodiment has two combustion chambers with a spool valve automatically shifted between two positions so each combustion chamber delivers its charge to the same expansion chamber during each engine cycle.

3 Claims, 10 Drawing Figures

ROTARY ENGINE

This application is a continuation-in-part of an application by the same inventors filed Apr. 18, 1983 under Ser. No. 485,720 and now abandoned.

This invention relates generally to internal combustion engines, and deals more particularly with a rotary engine which is designed to modify the usual four cycle mode of operation for such internal combustion engine. As a rule, all internal combustion engines generally perform according to the following cycle: suction—compression—working stroke—exhaust. Thus, internal combustion engines do not operate in continuous fashion as do gas turbine engines. Each part of the internal combustion engine cycle is conditioned by the position of either the piston in the cylinder or the rotor in a housing in the case of a rotary engine. There is of necessity a "dead-center" position separating the various parts of the cycle. The working mixture of fuel and air explodes inside a working chamber defined by the cylinder and piston, or by the rotor and housing or casing. Normally, the torque developed by such engines has a sinusoidal pattern when plotted graphically.

In accordance with the invention as disclosed in our original application the housing provided defines a cavity for rotatably receiving two counter-rotating rotors, said rotors having cooperatively shaped lobes which combine with one another inside the cavity to define at least an expansion chamber. The housing also defines a separate combustion chamber external to this expansion chamber but in communication with it and the counter-rotating rotors. A passageway is provided between the combustion chamber and the rotor defined expansion chamber and this passageway is equipped with a distribution valve such that the passageway is periodically opened or closed to provide a controlled conduit for the combustion gasses to expand through the passageway into the expansion chamber in order to drive the rotors and generate power.

An increase in engine efficiency is achieved by utilizing two such combustion chambers interacting with one pair of rotors. Whereas the previous design had the same number of combustion chambers as pairs of rotors, the improved design provides the need for fewer pairs of rotors and a more efficiently operating internal combustion rotary engine.

Whereas during the inactive portion of a cycle (exhaust and restarting) the counter-rotating rotors kept operating in a pump mode giving rise to a decrease in pressure in the chamber, the present invention obviates this design defect by altering the thermodynamics of the cycle during the exhaust and prestarting phase.

Another advantage of the improved two combustion chamber version of rotary engine to be described is the considerably shorter distance which the working gas must travel on its way from one of the two combustion chambers to the expansion chamber. This advantage is illustrated graphically in the drawings (See FIGS. 7 and 8) and will be referred to in greater detail hereinafter.

Figure 1:
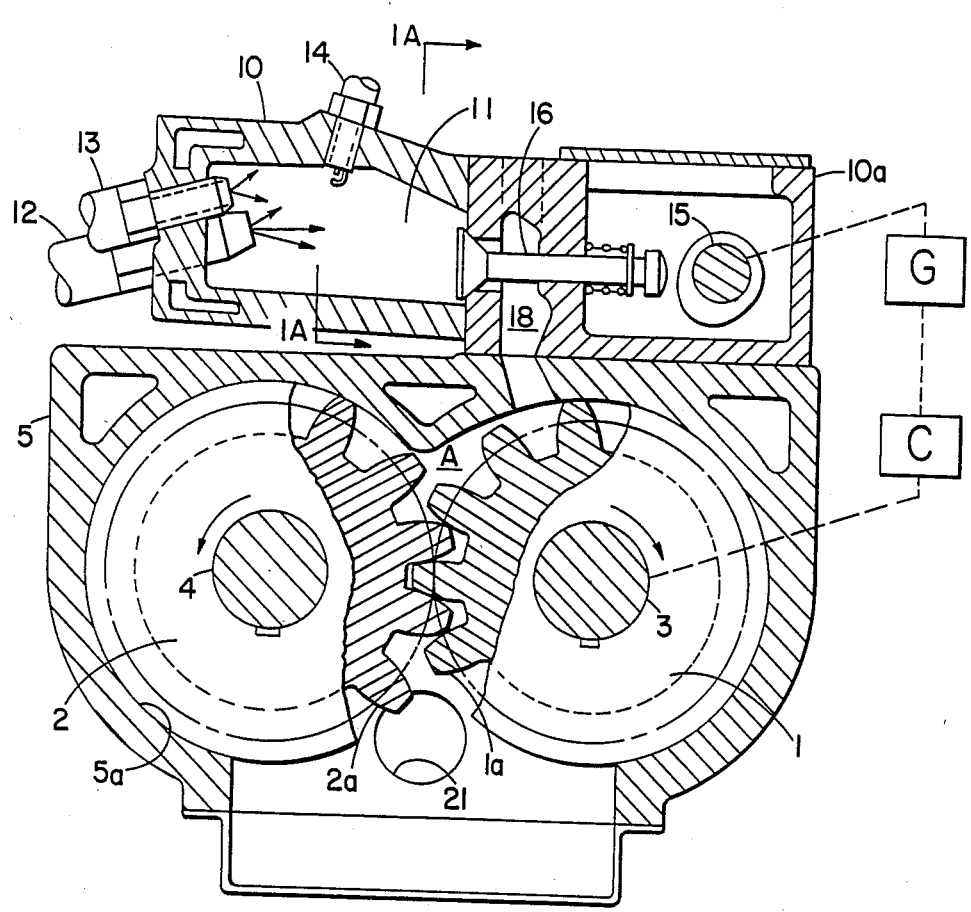
FIG. 1 is a vertical sectional view taken through an engine constructed in accordance with the present invention and can be designated as taken on the line 1—1 of FIG. 5.

Turning now to the drawings in greater detail, FIG. 1 shows a housing 5 defining a cavity 5a in which counter-rotating rotors 1 and 2 are mounted for rotation so that lobes 1a and 2a on these rotors 1 and 2 respectively are adapted to cooperate with one another and with the cavity walls in the area between the rotors to define an expansion chamber A to be described. Although two counter-rotating rotors are shown it will be apparent that other rotor configurations could be provided to define such an expansion chamber. For example, two rotors might be rotated in the same direction if one rotor were to be mounted inside the other.

Figure 5:
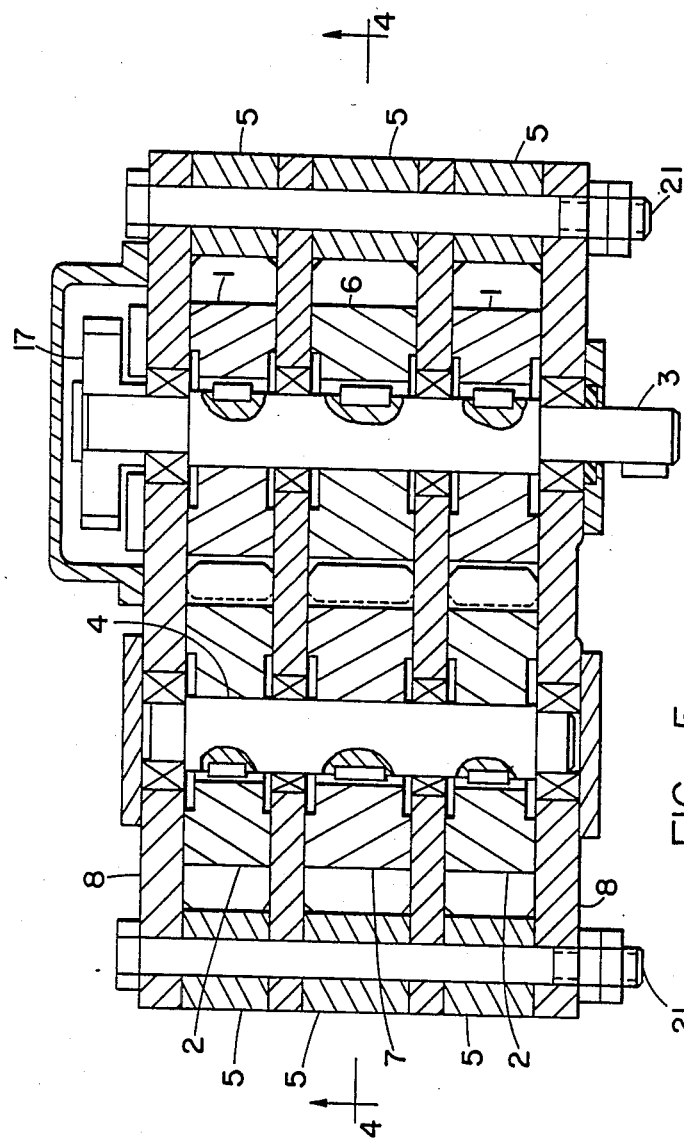
FIG. 5 is a horizontal section taken generally on the line 5—5 of FIG. 4.

FIG. 5 shows these rotors 1 and 2 mounted on shafts 3 and 4, which shafts are rotatably received in vertically extending plates 8, 8 which plates comprise part of the housing referred to previously. The housing is further defined by members 5, 5 provided between the plates and secured thereto by screws or other fastening devices 21, 21. As suggested in FIG. 5 two pairs of counter-rotating rotors are provided, the centermost rotary elements 6 and 7 being gears mounted on shafts 3 and 4 respectively to achieve synchronized rotation for the rotors 1, 2. A minimum clearance between the meshing working surface of the rotors is maintained.

Figure 4:
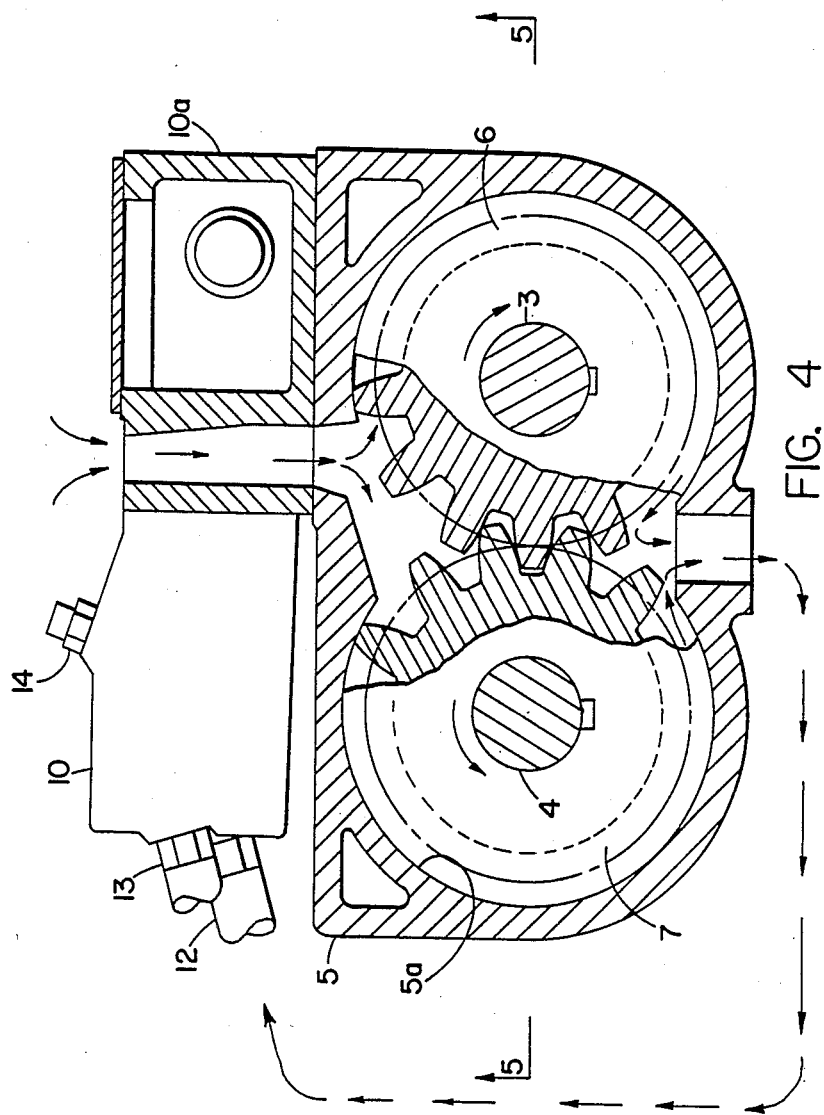
FIG. 4 is a vertical section taken generally on the line 4—4 of FIG. 5.

FIG. 4 shows these gears 6 and 7 in greater detail, and also illustrates that these gears are used as part of an air pumping means for super-charging the air delivered to the combustion section of the engine to be described. Still with reference to FIG. 5 the pairs of rotors 1, 1 and 2, 2 as well as the gears 6 and 7 are keyed to the shafts 3 and 4 respectively as shown therein. A gear 17 is provided on one end of the main shaft 3 in order to drive a cam shaft 15 which in turn operates valve elements 16, 20 to be described. Shaft 3 has its opposite end available for extracting work from the power plant but it will of course be apparent that shafts 3 and 4 are otherwise identical to one another and that shaft 4 might have one of its ends exposed for deriving energy therefrom in a direction opposite that of shaft 3.

Figure 2:
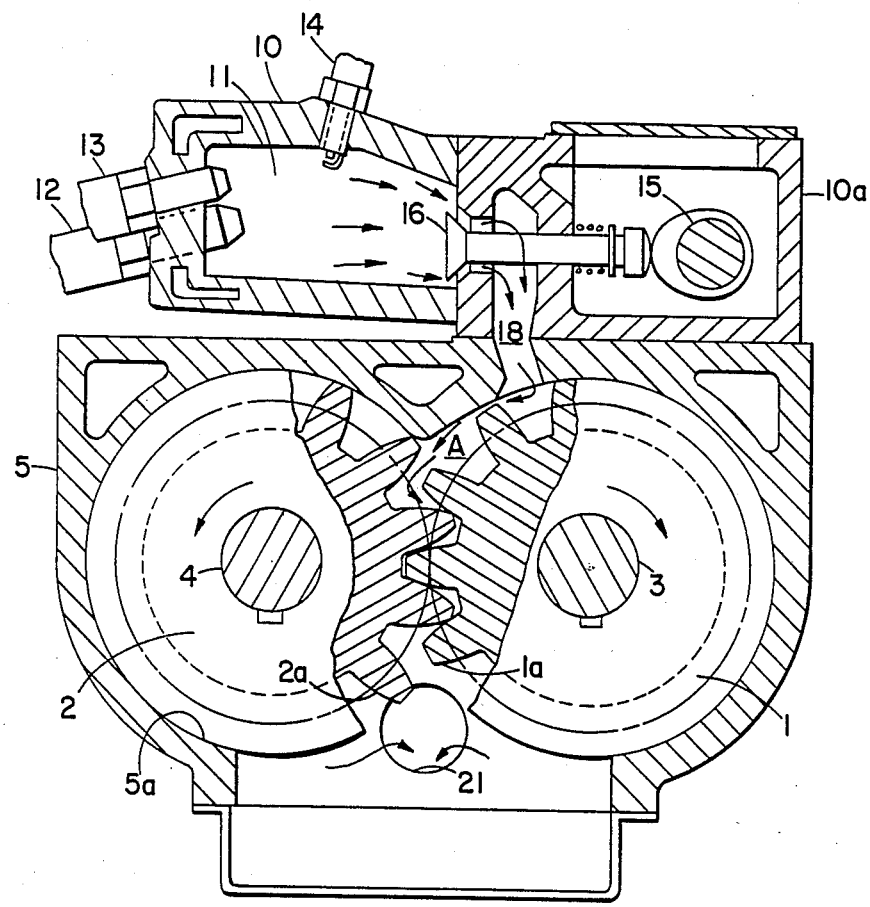
FIG. 2 is a vertical sectional view through the engine of FIG. 1 taken at a later instant of time during its cycle.
Figure 3:
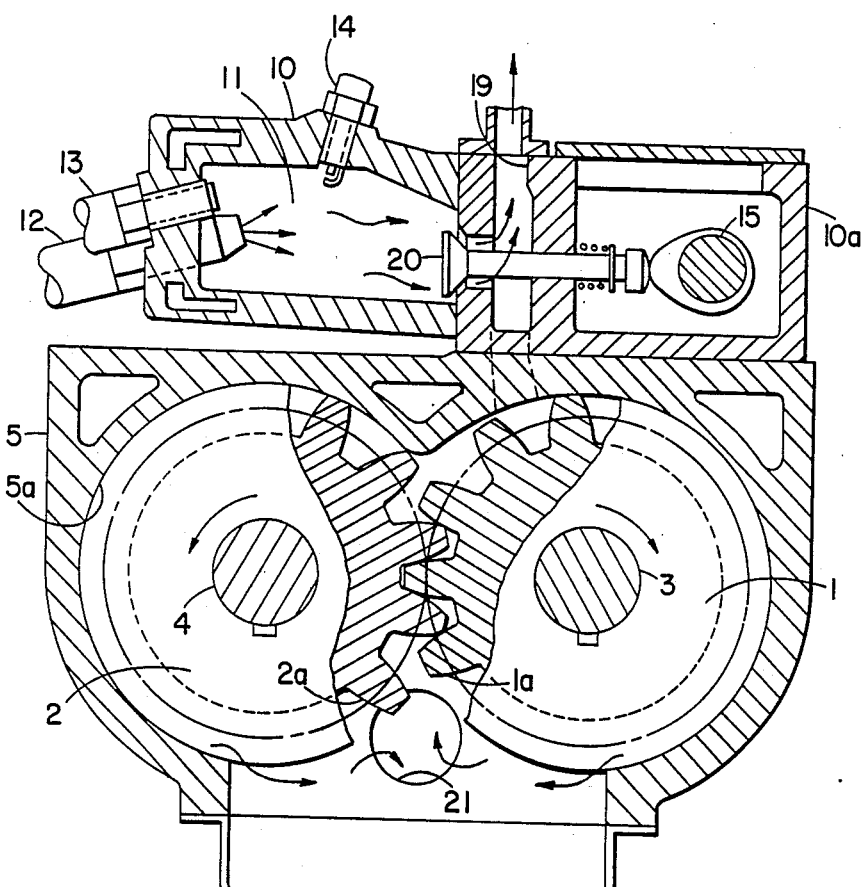
FIG. 3 is a view of the rotary engine depicted in FIGS. 1 and 2 at a still later instant of time.

As best shown in FIGS. 1, 2, and 3, a super-structure 10 and 10A is provided on the housing 5 and defines a separate combustion chamber 11 which is selectively placed in communication with the expansion chamber A by means of a passageway 18. This passageway 18 is periodically opened as a result of the action of the shaft 15 and valve element 16 referred to previously. This distribution valve means 15 and 16 is shown closed in FIG. 1 but is in its open position in FIG. 2 with the result that combustion gasses are allowed to pass from the combustion chamber 11 into the expansion chamber A imparting energy to the counter-rotating rotors 1 and 2, and more particularly by exerting pressure on the lobes which are illustrated as being formed in the nature of gear teeth. These lobes mesh much as gear teeth mesh, but the lobes are provided with sufficient clearance therebetween to virtually eliminate any friction, without unduly sacrificing the sealing engagement therebetween. An exhaust or outlet port 21 is provided in the housing 5 as best shown in FIG. 2.

FIG. 3 shows the cam shaft 15 and a second valve 20 in position for venting the products of combustion in the chamber 11 through vent means, in the form of port 19 provided in the casing 10A for this purpose. It will be apparent that valve elements 16 and 20 can be operated from a common cam shaft having cam lobes to actuate these valve elements and achieve the venting function for combustion chamber 11, and also for achieving the opening of passageway 18 as described previously. This casing 10 also has means for injecting fuel and air into the combustion chamber 11 at suitable times during the engines cycle of operation as dictated by a conventional fuel control device (not shown). A spark plug 14 may be provided in the casing 10 for exploding the mixture or charge of fuel and air in the combustion chamber 11 which plug 14 is also operated by a conventional spark generating system in order to achieve combustion at the desired point in the engine's cycle of operation.

By way of summary FIG. 1 shows a preliminary step in the engine cycle wherein passageway 18 and 19 are blocked by the distribution valve means 16 and 20 so that air can be injected into the combustion chamber 11 from a source of air under pressure (not shown) and so that fuel can also be injected in order that the spark plug 14 can be energized and this mixture exploded to create the desired pressure in the chamber 11.

As best shown in FIG. 2 the valve 16 releases these compressed gases into expansion chamber A between the working rotors 1 and 2. The pressure so created in expansion chamber A will soon be equal to that in compression chamber 11 and the result will develop a torque on rotors 1 and 2 causing them to rotate. As the rotors move the pressure of the combustion gasses decreases. The exhaust gas mixture from the expansion chamber A is carried around the periphery of the rotors 1 and 2 and discharged through the port 21. At a certain predetermined pressure in combustion chamber 11 valves 16 and 20 close, preferably in response to a predetermined angular degree of rotation for the rotors or the rotating cam shafts.

FIG. 3 shows the exhaust portion of the cycle in greater detail, and also illustrates the venting of the combustion chamber 11. In the position shown in FIG. 3 the camshaft 15 will have opened up exhaust valve 20 so that passageway 19 vents the combustion chamber 11 dropping the pressure to atmospheric. Air injector 12 opens just prior to reclosing of exhaust valve 20 thereby forcing any remnants of combustion out of the chamber 11 and assuring that optimum conditions for combustion are present for the next performance cycle (See FIG. 6). Valves 16 and 20 reach their second closed positions similar to that shown in FIG. 1 and the same sequence of events will again occur due to the inertia of the system and due also to the fact that the version described herein has two pairs of working rotors 1, 1 and 2, 2 as best shown in FIG. 5.

It is a further feature of the present invention that sufficient time is available prior to the sequential or periodic opening of the inlet valve 16 so that there exists a possibility for applying voltage to the spark plug 14 more than once during the cycle, a fact which contributes to the engine's greater reliablity and efficiency. As mentioned previously more than one pair of working rotors may be utilized, and it will be apparent that these additional pairs of rotors may be phase displaced with respect to one another in connection with the working operation of their associated distribution valve. While the cam shafts may be geared directly to the main rotor shaft 3 through a gear such as that shown at 17 on the end of shaft 3. There is no need in precise synchronization of the revolutions of the main shaft and the camshaft and of their positioning. Among the advantages of this configuration are the fact that it makes it possible to start the engine by rotating only the camshaft with the help of a subsidiary low-power engine; this is accomplished with the main system (working wheels 1 and 2, compressor wheels 6 and 7, shafts 3 and 4) being at rest. Such an arrangement helps make the starting sequence considerably more efficient. It also allows to control the engine revolutions (and power) by changing the number of revolutions (the number of cycles) of the camshaft with the help of a programmed device quite independent of engine speed.

Figure 6:
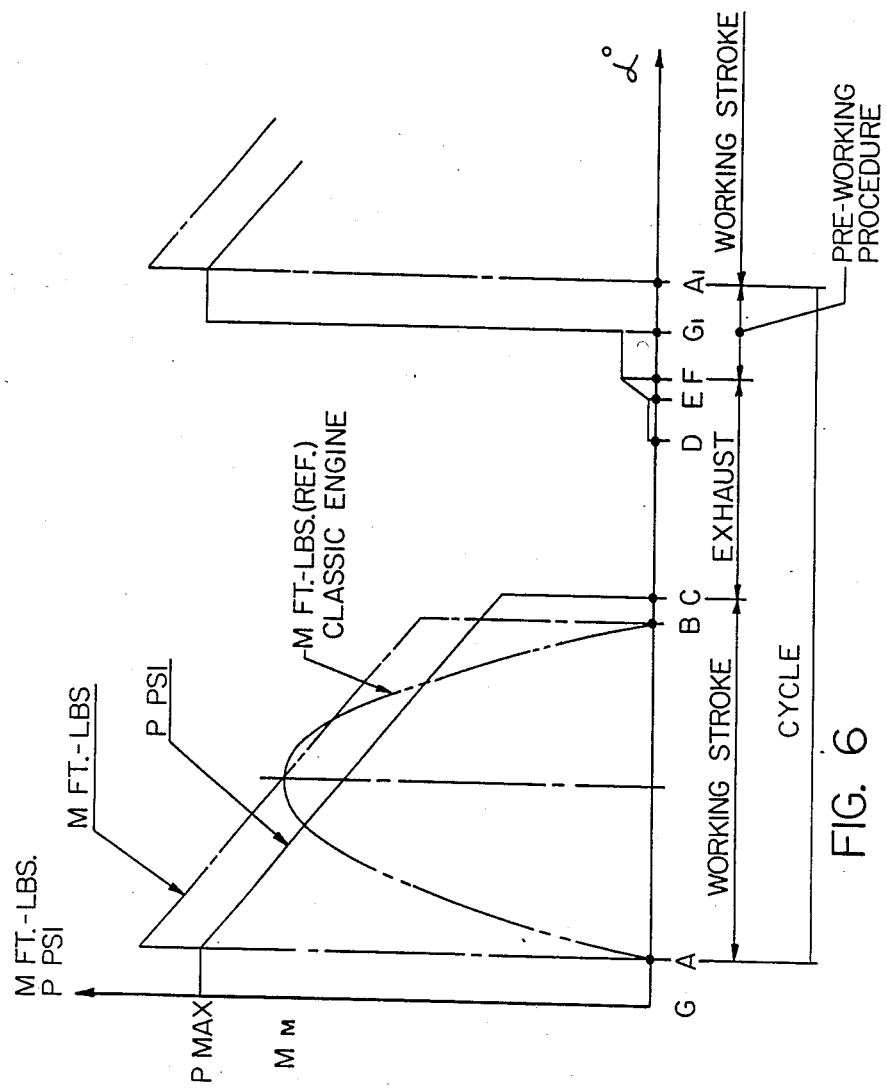
FIG. 6 is a schematic view illustrating the variation of pressure within the combustion chamber and the work output or moment of the rotor shaft during a typical cycle. The cycle of a conventional engine is also shown for comparison purposes.
Figure 7:
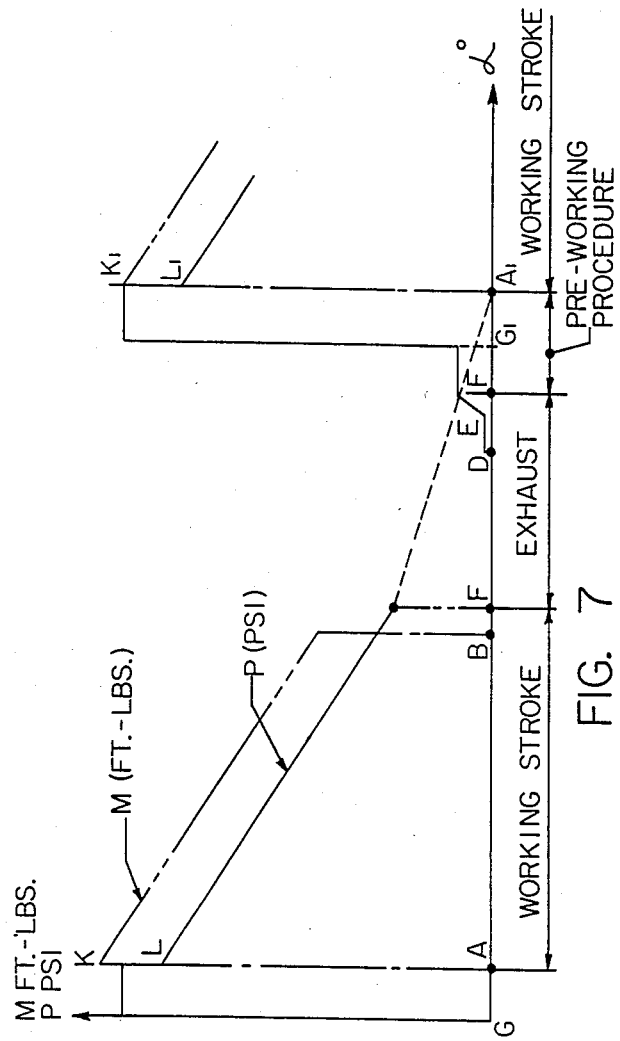
FIG. 7 is a schematic view similar to FIG. 6 but illustrating the improvement achieved as a result of modifying the rotary engine described in the original application in accordance with the additional disclosure submitted in this continuation-in-part application.
Figure 8:
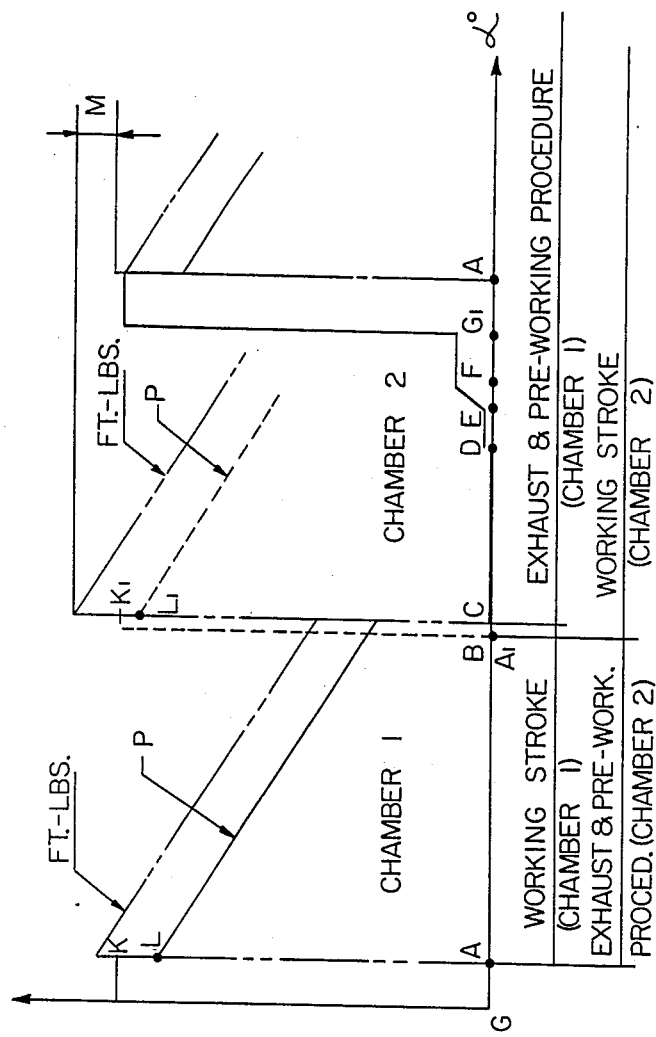
FIG. 8 shows the results achieved by the improvement referred to in the preceeding paragraph and illustrates graphically the effect of the second combustion chamber provided with each pair of working counter-rotating rotors.

Turning next to the schematic FIG. 6 representation of internal pressure P and work output M during a typical engine cycle, the initial compression G-A is shown to illustrate that this engine does not yield the slow build up in work output M(REF) characteristic of a classic internal combustion engine (as shown in phantom lines). Thus, the work level represented by the M curve (solid line) from A-B represents a significant advantage over this M(REF) curve for a given mean effective pressure or level of work or moment Mm. It should also be noted that the exhaust phase C-G differs slightly from that of the conventional four cycle engine in that air injected into compression chamber 11 D-E causes the remnants of combustion products to be exhausted, and that closing of the exhaust valve E-F will create a slight excess air pressure at F in the combustion chamber even before the fuel is injected. The mixture is ignited at G to create the initial high pressure Pmax in the chamber 11, and the cycle is repeated from G at the left side of FIG. 6.

FIG. 1 also shows cam shaft 15 coupled to rotor shaft 3 by conventional gearing G and also by a clutch C such that these shafts can be selectively coupled or decoupled as needed during the starting cycle or operating cycle of the engine. Decoupling the cam shaft from the rotor shaft facilitates starting in that less energy is needed to rotate these shafts during start up of the rotary engine.

Figure 1A:
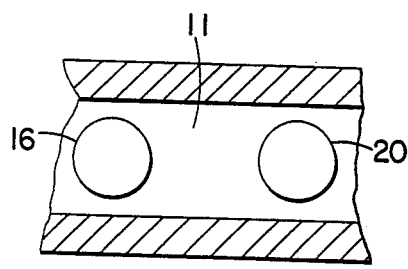
FIG. 1A is a sectional view taken generally on the line 1A—1A of FIG. 1.

The exhaust valve 20 and intake valve 16 of FIGS. 3 and 1 respectively are located in side-by-side relationship as best shown in FIG. 1A. The engine shown is adapted for operation under the control of the fuel control such that fuel injectors 13, 13 supply fuel at the appropriate pressure to the combustion chamber or chambers. In the pumping stage illustrated in FIG. 4 atmospheric pressure is available as suggested at 24 such that it is drawn into the chamber defined by the counter-rotating rotors as suggested by the arrows in this view. The pressurized air emanates from the outlet port 23 of this pumping stage and may be fed directly to the air injector 12 as suggested in FIG. 4.

Figure 9:
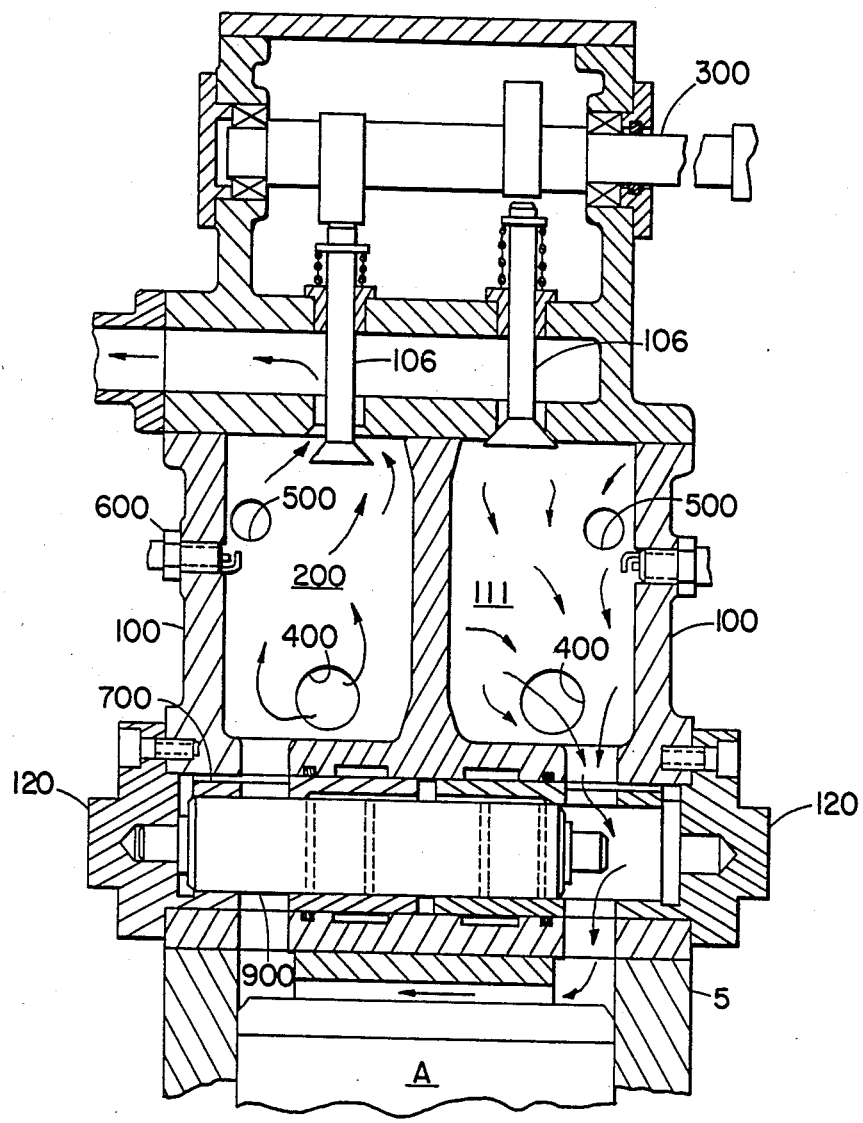
FIG. 9 shows the improvement to the rotary engine disclosed in our original application and the means for sequentially feeding the charges from each of the two combustion chambers to the expansion cavity associated with a single pair of counter-rotating rotors.

Turning now to the detailed description of the improvement to the rotary engine of FIGS. 1-6 and referring particularly to the structure illustrated in FIG. 9, the counter-rotating rotors are provided in the housing 5 and may be coupled to the cam shaft 300 in much the same manner as rotor shaft 3 is coupled to the cam shaft described previously with reference to the embodiment shown in FIGS. 1-6. A portion of one rotor 1 is shown such that it and it's counter-rotating rotor (not shown) cooperate, with one another to define an expansion chamber in the area indicated generally by reference A. The reader is referred to FIG. 1 and to the A there shown for an understanding of the location for the improvement to the rotary engine to be described.

In place of the single combustion chamber 11 provided for each of the counter-rotating pairs of rotors 1 and 2 of FIG. 1, FIG. 9 shows a pair of such combustion chambers 111 and 200 defined by housing 100 and selectively communicable with the expansion chamber defined between the rotors as a result of spool valve 900 provided in a valve chamber defined between the rotor housing 5 and the combustion chamber housing 100 and best illustrated in vertical section at 120. This housing 120 is made up of opposed plates as shown secured to the housing 100 and to the rotor casing itself so as to define a valve chamber therebetween in which a sliding spool valve 900 is provided such that it can be shifted from the position shown to an opposite limit position with the result that either one or the other of the two combustion chambers are alternately placed in communication with the rotor expansion chamber A and isolated therefrom.

As suggested in FIG. 9 a pair of valves 106 and 106 operate in sequence from cams on cam shaft 300 to open and close the combustion chambers 111 and 200 so that these chamber ultimately supply the desired mixture of fuel and air from injectors similar to those described above with reference to 12 and 13 and these chambers are exhausted each in its turn when each of the valves 106, 106 open in turn. As shown in FIG. 9 one chamber has its valve closed and the other open so that the reader can visualize feeding of the combustion gases from chamber 111 downwardly through the passageway defined by the right-hand end of the spool valve 900 into the expansion chamber A at the very moment while the remaining combustion gases in chamber 200 are exhaused preparatory to reversal of this sequence of steps all during a single cycle of operation of the engine. Port 400 indicates the air injectors and port 500 the fuel injectors for the two combustion chambers 111 and 200. It is noted that spool valve 900 has no external means for shifting said valve from the position shown to its opposite limit position and this is made possible by virtue of the difference in pressure between the opposite ends of the slide valve 900 such that these pressure differentials cause the slide valve to travel from its leftmost to its rightmost limit position in an automatic fashion soley as a result of the pressures achieved. As a cycle continues chamber 200 becomes charged and chamber 100 exhausted. Spool valve 900 has it's left hand end 800 acted on by the pressure of the gasses in chamber 200, through the space 700, shifting valve 900 to its opposite mirror image position. This action continues as the engine continues to operate.

We claim:

1. A rotary engine, comprising a housing defining a cavity, at least two rotors in said cavity, means for rotating said rotors on spaced axes of rotation and in opposite directions, said rotors having lobes which interact with the cavity walls and with one another to define an expansion chamber, said housing also defining a combustion chamber spaced from said cavity, a passageway having one end communicating with said expansion chamber and an opposite end communicating with said combustion chamber, valve means in said passageway for periodically opening said passageway to provide a conduit for the combustion gasses to expand into said expansion chamber, and said interacting rotor lobes meshing with one another at a point between said spaced rotor axes of rotation, said expansion chamber provided between said meshing rotor lobes and said passageway one end, said lobes of at least one rotor defining said expansion chamber during movement from said point of lobe meshing toward said passageway one end, means for periodically injecting fuel and means for injecting air into said combustion chamber, said valve means opening said passageway and said fuel and air injecting means operating in timed relation to one another, vent means for venting said combustion chamber and operable in timed relationship with said valve means for venting residual combustion gasses from said combustion chamber prior to the introduction of a succeeding fuel and air charge, said rotor means comprising parallel shafts supporting rotating rotors, said shafts rotatably supported in said housing, and meshing gears on said shafts to achieve said rotation, said valve means comprises first and second valve elements reciprocably mounted in inlet and outlet ports communicating with said combustion and said expansion chambers respectively, and a cam shaft for moving said valve elements, and valve element biasing means for each said valve element, said cam shaft moving said valve elements against the force of said biasing means at selected times during the engine's cycle of operation, and said cam shaft coupled to said rotor support shafts, means for decoupling said cam shaft from said rotor shafts at least during engine start-up, whereby the power necessary for starting is minimized as a result of not having to turn the rotors and to operate any device coupled thereto.

2. A rotary engine, comprising a housing defining a cavity, at least two rotors in said cavity, means for rotating said rotors on spaced axes of rotation and in opposite directions, said rotors having lobes which interact with the cavity walls and with one another to define an expansion chamber, said housing also defining a combustion chamber spaced from said cavity, a passageway having one end communicating with said expansion chamber and an opposite end communicating with said combustion chamber, valve means in said passageway for periodically opening said passageway to provide a conduit for the combustion gasses to expand into said expansion chamber, and said interacting rotor lobes meshing with one another at a point between said said spaced rotor axes of rotation, said expansion chamber provided between said meshing rotor lobes and said passageway one end, said lobes of at least one rotor defining said expansion chamber during movement from said point of lobe meshing toward said passageway one end, means for periodically injecting fuel and means for injecting air into said combustion chamber, said valve means opening said passageway and said fuel and air injecting means operating in timed relation to one another, vent means for venting said combustion chamber and operable in timed relationship with said valve means for venting residual combustion gasses from said combustion chamber prior to the introduction of a succeeding fuel and air charge, said rotor means comprise parallel shafts supporting rotating rotors, said shafts rotatably supported in said housing, and meshing gears on said shafts to achieve said rotation, and said housing defines at least two combustion chambers associated with said two counter-rotating rotors, said passageway including a valve chamber and a valve element in said valve chamber movable between limit positions such that said at least two combustion chambers are selectively placed in communication with said expansion chamber, and wherein said valve member comprises a spool element adapted to shift between two limit positions solely as a result of gas pressure achieved in said two combustion chambers and said expansion chamber.

3. The rotary engine of claim 2 wherein each of said two combustion chambers includes means for introducing fuel and air thereto.

* * * * *